(12) United States Patent
Kisaka

(10) Patent No.: US 7,626,780 B2
(45) Date of Patent: Dec. 1, 2009

(54) MAGNETIC DISK DRIVE

(75) Inventor: Masashi Kisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 42 days.

(21) Appl. No.: 12/148,008

(22) Filed: Apr. 15, 2008

(65) Prior Publication Data

US 2008/0259491 A1 Oct. 23, 2008

(30) Foreign Application Priority Data

Apr. 19, 2007 (JP) .............................. 2007-110783

(51) Int. Cl.
*G11B 21/02* (2006.01)
*G11B 5/596* (2006.01)
(52) U.S. Cl. .................... 360/75; 360/77.02; 360/78.05
(58) Field of Classification Search .................. None
See application file for complete search history.

(56) References Cited

U.S. PATENT DOCUMENTS 6,674,605 B1 * 1/2004 Ell ........................... 360/78.05

FOREIGN PATENT DOCUMENTS

JP 2006-147116 A 6/2006

\* cited by examiner

*Primary Examiner*—Kin Wong
(74) *Attorney, Agent, or Firm*—Townsend and Townsend and Crew LLP; Patrick Duncan

(57) ABSTRACT

Embodiments of the present invention help to provide a magnetic disk drive that is capable of reducing a time period necessary for positioning a magnetic head when positioning the magnetic head by use of a dual-stage actuator. According to one embodiment, a main control circuit of a magnetic head device selects one of a seek mode and a positioning mode. The seek mode is to set a coarse adjustment control system to be a stable system by not causing control of a piezoelectric actuator to be performed by a fine adjustment control circuit. The positioning mode is to set the coarse adjustment control system to be an unstable system and setting a total control system inclusive of the coarse adjustment control system and a fine adjustment control system to be the stable system by causing the control of the piezoelectric actuator to be performed by the fine adjustment control circuit. Thereby the main control circuit causes the control system to operate.

3 Claims, 7 Drawing Sheets

Fig.4
(A) SEEK MODE
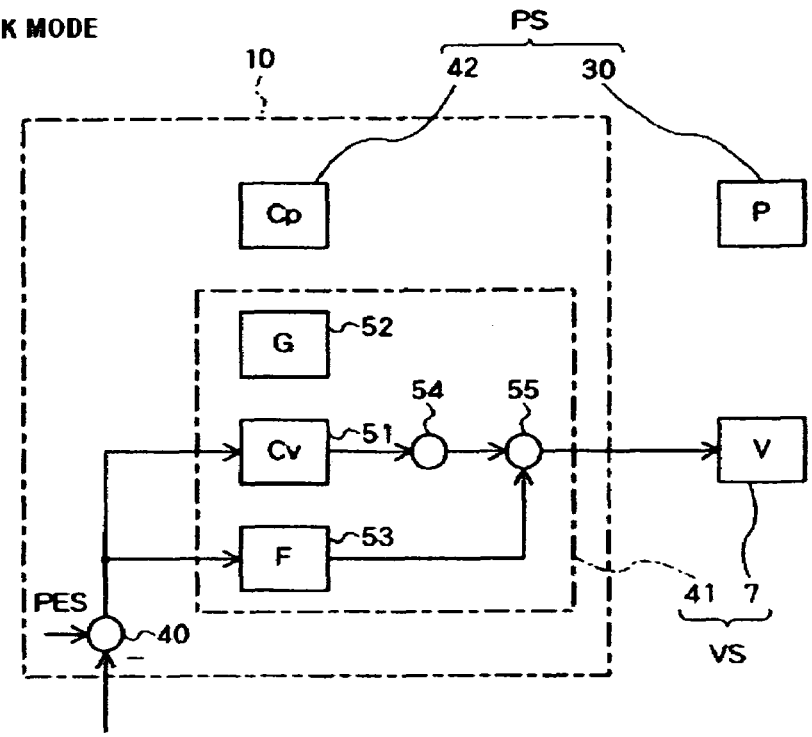
(B) POSITIONING MODE
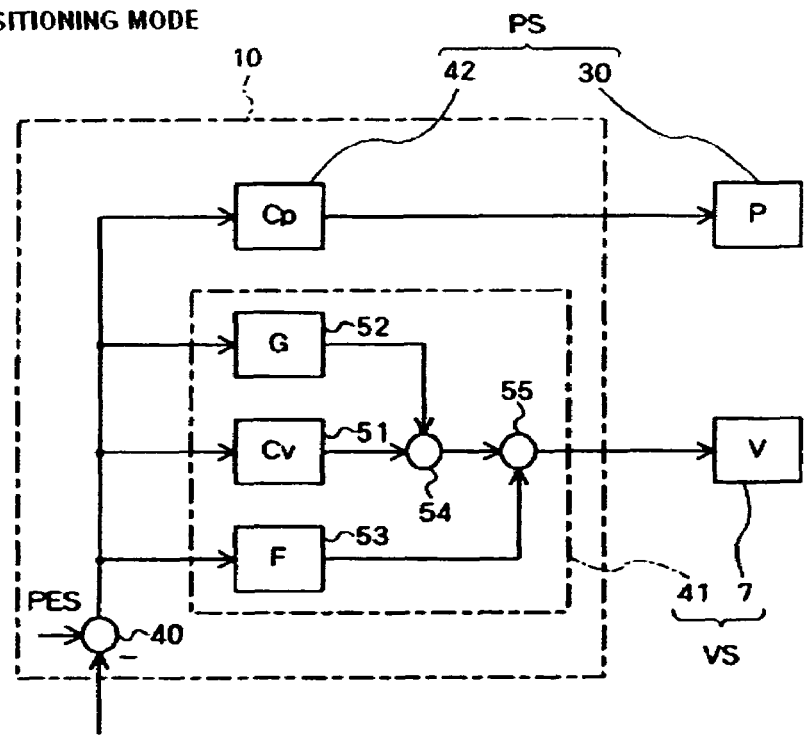

OPEN LOOP CHARACTERISTIC

STEP RESPONSE

Fig.8
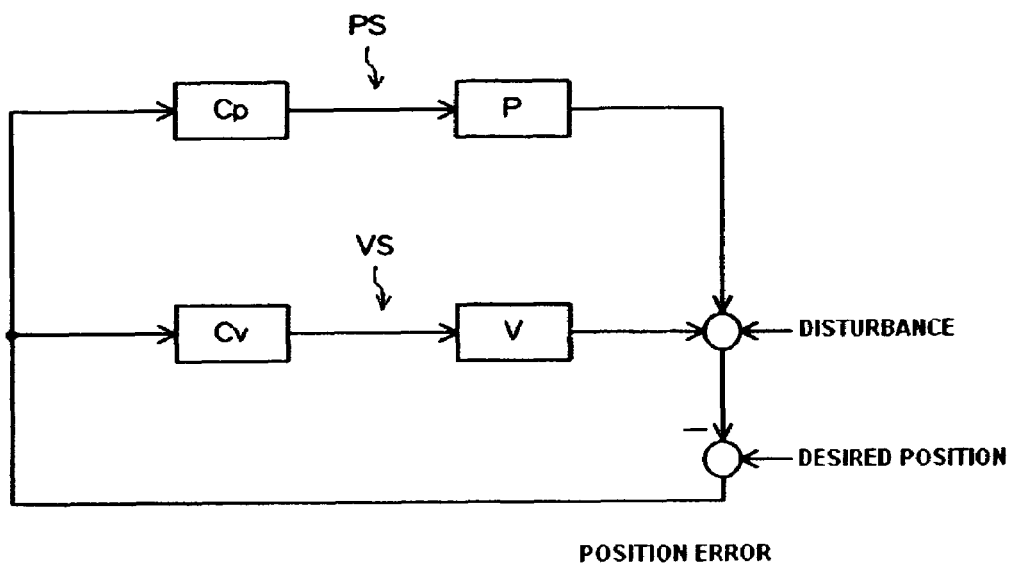
(A)
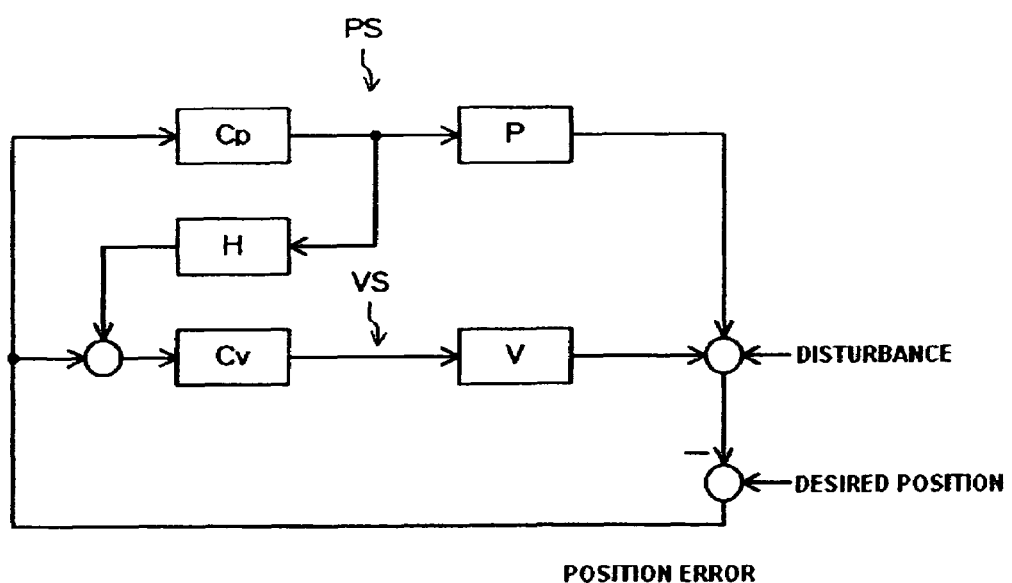
(B)

US 7,626,780 B2

MAGNETIC DISK DRIVE

CROSS-REFERENCE TO RELATED APPLICATION

The instant nonprovisional patent application claims priority to Japanese Patent Application No. 2007-110783 filed Apr. 19, 2007 and which is incorporated by reference in its entirety herein for all purposes.

BACKGROUND OF THE INVENTION

A hard disk drive for a magnetic disk, such as a hard disk, has a voice coil motor for driving an arm that supports a magnetic head. The voice coil motor is controlled to position the magnetic head onto a desired position over the magnetic disk, whereby recording/playback of information is performed thereon.

In recent years, there have been proposed magnetic disk drives of the type that, in addition to a coarse regulation actuator, such as a voice coil motor and the like, has a fine adjustment actuator, i.e., so-called two-stage or dual-stage actuator, formed from a piezoelectric element or the like and provided to the arm for further improving the positioning accuracy.

FIG. 8 shows the magnetic disk drive as conventional examples of a feedback control system including a dual-stage actuator. FIG. 8(A) shows a conventional example in which a coarse adjustment control system VS, which is inclusive of a coarse adjustment control actuator V and a coarse adjustment control circuit Cv therefore, and a fine adjustment control system PS, which is inclusive of a fine adjustment actuator P and a fine adjustment control circuit Cp therefore, are provided independently of one another.

In this case, the coarse adjustment control circuit CV controls the coarse adjustment actuator V so that the magnetic head is moved towards the desired position. In an alternative expression, the coarse adjustment control system VS is designed to be a stable system in which a current position of the magnetic head is converged to a desired position corresponding to a stable point. The fine adjustment control system PS also is similarly designed.

Nevertheless, however, the thus designed coarse adjustment control system VS is slow in response speed in comparison to the fine adjustment control system PS, such that the operation of the course adjustment actuator V serves as hindrance to the extent of increasing a time period necessary for positioning the magnetic head.

A technique can be contemplated that causes the coarse adjustment actuator V to substantially not operate, but causes the positioning of the magnetic head to be achieved only with operation of the fine adjustment actuator P. However, only with the operation of the fine adjustment actuator P, the time period necessary for positioning the magnetic head cannot be reduced.

FIG. 8(B) shows a conventional example in which the coarse adjustment control circuit Cv utilizes a control value output form the fine adjustment control circuit Cp. In this case, since the coarse adjustment control circuit Cv calculates the control value after the fine adjustment control circuit Cp has calculated the control value, a time period is taken until the coarse adjustment control circuit Cv outputs the control value to the coarse adjustment actuator V.

BRIEF SUMMARY OF THE INVENTION

Embodiments of the present invention help to provide a magnetic disk drive that is capable of reducing a time period necessary for positioning a magnetic head when positioning the magnetic head by use of a dual-stage actuator. According to the particular embodiment shown in FIG. 3, a main control circuit 10 of a magnetic head device selects one of a seek mode and a positioning mode. The seek mode is to set a coarse adjustment control system VS to be a stable system by not causing control of a piezoelectric actuator 30 to be performed by a fine adjustment control circuit 42. The positioning mode is to set the coarse adjustment control system VS to be an unstable system and setting a total control system inclusive of the coarse adjustment control system VS and a fine adjustment control system PS to be the stable system by causing the control of the piezoelectric actuator 30 to be performed by the fine adjustment control circuit 42. As a result, the main control circuit causes the control system to operate.

BRIEF DESCRIPTION OF THE DRAWINGS

FIGS. 4(A) and (B) are explanatory views showing examples of functional configurations of main control circuits.

FIGS. 8(A) and 8(B) are block diagrams showing a feedback control system of a magnetic disk drive including a dual-stage actuator.

DETAILED DESCRIPTION OF THE INVENTION

Figure 1:
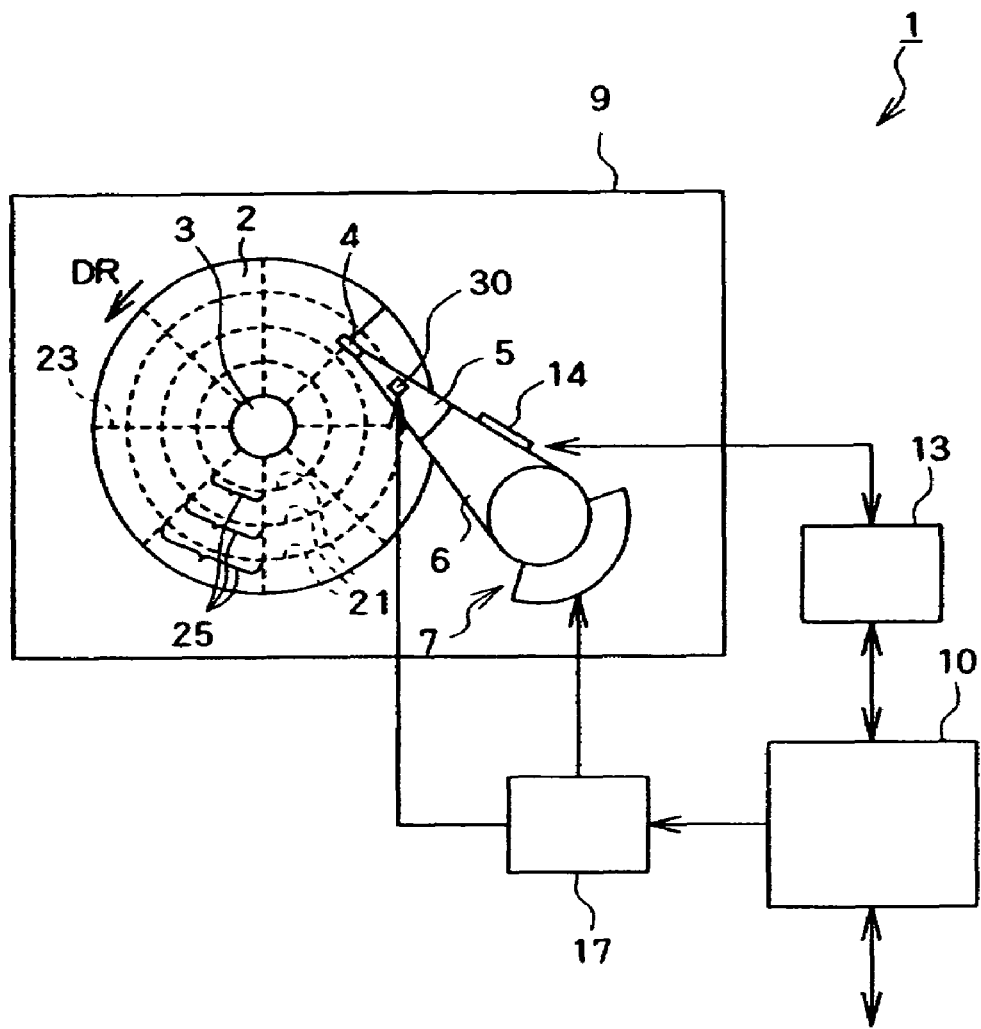
FIG. 1 is a block diagram showing an example of the configuration of a magnetic disk drive according to one embodiment of the present invention.

Embodiments of the present invention relate to a magnetic disk device.

Embodiments of the present invention are made in view of the circumstances described above. Accordingly, one object of embodiments of the invention is to provide a magnetic disk drive that is capable of reducing the time period necessary for positioning a magnetic head when positioning the magnetic head by use of a dual-stage actuator.

In order to solve the problems described above, a magnetic disk drive according to an embodiment of the present invention is characterized by including a magnetic disk medium; a magnetic head for reading out information recorded in the magnetic disk medium; an arm for supporting the magnetic head; a first actuator for actuating the arm to perform control of a position of the magnetic head on the magnetic disk; a second actuator for adjusting the position of the magnetic head on the arm; a position error signal generation circuit for generating a position error signal indicative of an error between a desired position of the magnetic head and a present position of the magnetic head in accordance with the information read out by the magnetic head; a first control circuit for generating a signal for controlling the first actuator in accordance with the position error signal and for outputting the signal; a second control circuit for generating a signal for controlling the second actuator in accordance with the position error signal and for outputting the signal; and a main control circuit for selecting one of first and second modes in accordance with the position error signal, the first mode being for setting a control system inclusive of the first control circuit and the first actuator to be a stable system by not causing control of the second actuator to be performed by the second control circuit, and the second mode being for setting the control system for setting a control system inclusive of the first control circuit and the first actuator to be an unstable system and setting a control system inclusive of the first control circuit, the first actuator, the second actuator, and the second actuator to be a stable system by causing the control of the second actuator to be performed by the second control circuit, thereby to causing the control circuits to operate.

A magnetic disk drive according to embodiments of the present invention is further characterized in that the first control circuit includes a stable control element circuit and an unstable control element circuit that outputs an output signal being added to an output of the stable control element circuit to thereby set the control system inclusive of the first control circuit and the first actuator to be the unstable system; when being operated by the main control circuit in the first mode, the unstable control element circuit is not operated, but the stable control element circuit is operated, thereby to set the control system inclusive of the first control circuit and the first actuator to be the stable system; and when being operated by the main control circuit in the second mode, the unstable control element circuit and the stable control element circuit are both operated, thereby to set the control system inclusive of the first control circuit and the first actuator to be the unstable system.

A magnetic disk drive of embodiments of the present invention is further characterized in that the first control circuit includes a filter circuit that imparts a predetermined modification to an output signal being output to the first actuator in accordance with the position error signal in any one of the first mode and the second mode.

According to embodiments of the present invention, the response speed can be increased in the manner that the control system inclusive of the first control circuit and the first actuator is set to be the unstable system. Consequently, when positioning the magnetic head by utilizing the first actuator and the second actuator, the time period necessary for positioning the magnetic head can be reduced without being hindered by the operation of the first actuator.

Certain embodiments of the present invention will be described herebelow with reference to the drawings.

FIG. 1 shows an example of the configuration a magnetic disk drive of one embodiment of the present invention. The magnetic disk drive, which is denoted by numeral 1, includes a magnetic disk 2, a spindle motor 3, a magnetic head 4, a suspension arm 5, a carriage 6, a voice coil motor 7, a head amplifier 14, and a piezoelectric actuator 30 in a housing 9.

The magnetic disk drive 1 includes a main control circuit 10, a read/write channel 13 (R/W channel), and a driver 17 on a baseboard external of the housing 9. The main control circuit 10 includes a microprocessing unit (MPU) and a hard disk controller (HDC).

The magnetic disk 2 is mounted to the spindle motor 3, and is rotationally driven along the direction of an arrow DR in the drawing. A plurality of tracks 21 are concentrically formed on the magnetic disk 2. A servo data field 23 is provided on the respective track 21 along the circumferential direction at a predetermined cycle time. A portion between each servo data field 23 is formed as a user data field 25.

The magnetic head 4 includes a playback element and a recording element. The magnetic head 4 is mounted to a leading edge portion of the suspension arm 5 and is supported on the magnetic disk 2. The suspension arm 5 is mounted to the carriage 6 that is partly integral with the voice coil motor 7.

Figure 2:
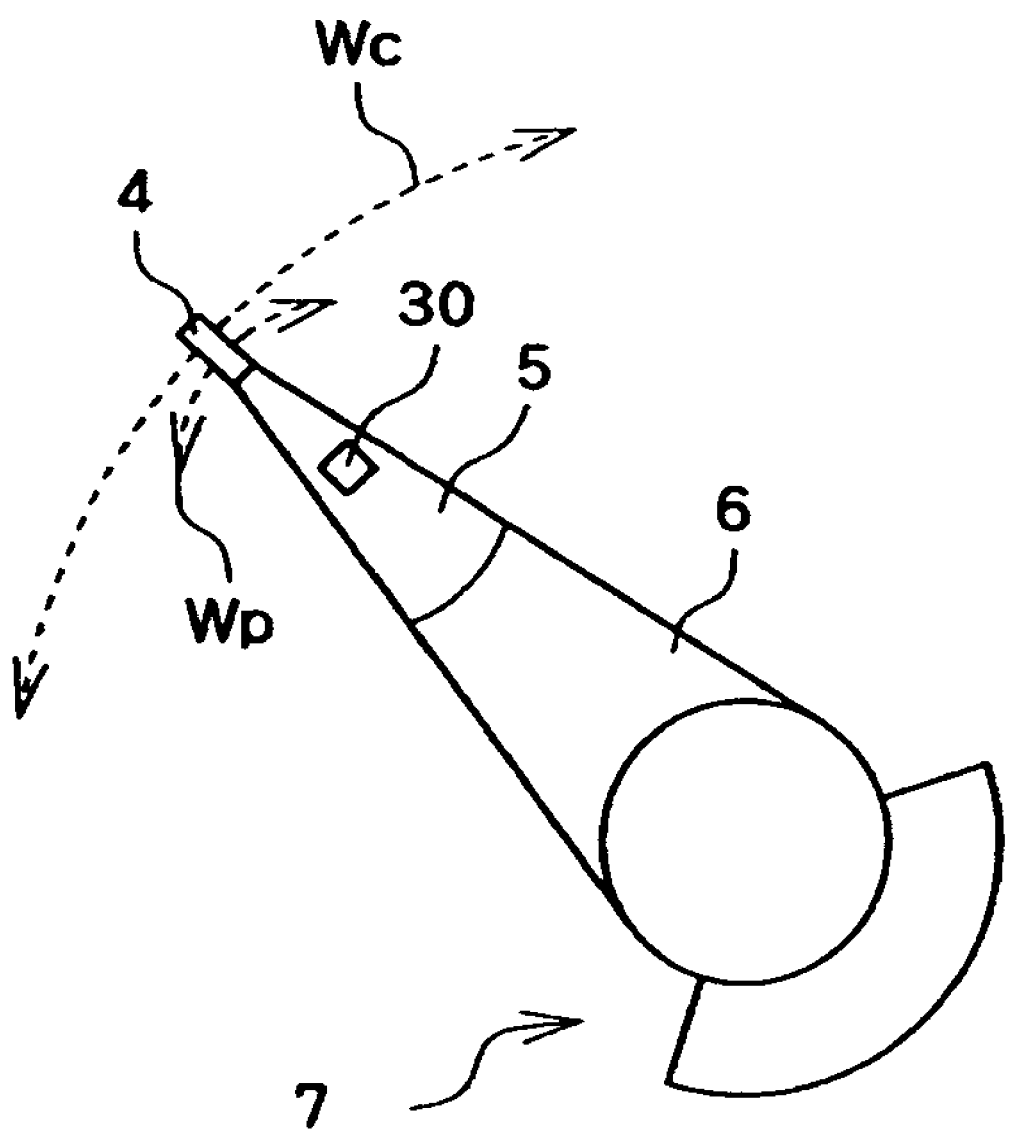
FIG. 2 is an explanatory view showing a movable width of a magnetic head movable by an actuator.

The voice coil motor 7 is one example of a coarse adjustment actuator (first actuator). With reference to FIG. 2, the voice coil motor 7 pivotally actuates the suspension arm 5, thereby to move the magnetic head 4 along substantially the radial direction on the magnetic disk 2. A broken line arrow Wc in FIG. 2 is indicative of a movable width of the magnetic head 4 when moved with the operation of the voice coil motor 7.

The piezoelectric actuator 30 is one example of a fine adjustment actuator (second actuator), and is configured including a piezoelectric element. The piezoelectric actuator 30 is mounted to a leading edge portion of the suspension arm 5, and pivotally actuates the leading edge portion to thereby cause a positional deflection of the magnetic head 4. In FIG. 2, a broken line arrow Wp is indicative of a movable width of the magnetic head 4 when moved with the piezoelectric actuator 30.

Referring back to FIG. 1, the MPU, which is included in the main control circuit 10, provides control of the overall drive, reads out programs stored in a memory (not shown) and executes them, thereby realizing various types of control, such as positioning control of the magnetic head 4 and recording/playback control of data, for example. In the present embodiment, the MPU functions as a position error signal generation circuit, first control circuit, and second control circuit. These circuits will be described in detail below.

For the positioning control of the magnetic head 4, the MPU specifies the present position of the magnetic head 4 in accordance with servo data input from the R/W channel 13, and generates a position error signal (PES) indicative of a desired position and present position of the magnetic head 4. In accordance with the PES, the MPU generates a control signal for driving the voice coil motor 7 and outputs the signal to the driver 17. Thereby, the magnetic head 4 is "seeked" (sought) to the track in the desired position and is positioned therein. Further, in the event of post-seek positioning, the MPU generates a control signal for driving the piezoelectric actuator 30 in accordance with the PES and outputs it to the driver 17. Thereby, the magnetic head 4 is accurately positioned over the track in the desired position.

The HDC, which is included in the main control circuit 10, includes, for example, an interface controller, a position error correction circuit, and a buffer controller. Upon receipt, from an external host, user data desired to be recorded onto the magnetic disk 2, the HDC outputs the user data to the R/W channel 13. On the other hand, upon receipt from the R/W channel 13 user data reproduced from the magnetic disk 2, the HDC transmits the user data to the external host. In this case, in response to control received from the MPU, the HDC temporarily stores the user data into a buffer memory (not shown).

When user data is input from the main control circuit 10, the R/W channel 13 modulates the user data and outputs it to the head amplifier 14. Further, when a playback signal read out by the magnetic head 4 from the magnetic disk 2 is input from the head amplifier 14, the R/W channel 13 converts the playback signal into digital data, and demodulates and outputs the data to the main control circuit 10. Further, the R/W channel 13 extracts servo data from the playback signal at a predetermined sampling time period, and outputs the resultant data to the main control circuit 10.

When data desired to be recorded onto the magnetic disk 2 is input from the R/W channel 13, the head amplifier 14 processes the data into a recording signal and outputs it to the magnetic head 4. Further, when a playback signal reproduced from the magnetic disk 2 is input from the magnetic head 4, the head amplifier 14 amplifies the playback signal and outputs the resultant signal to the R/W channel 13.

When a control signal for the voice coil motor 7 is input from the main control circuit 10, the driver 17 modulates the control signal to an analog signal, amplifies the analog signal, and outputs the resultant signal to the voice coil motor 7. Further, when a control signal for the piezoelectric actuator 30 is input from the main control circuit 10, the driver 17 converts the control signal to an analog signal, amplifies the analog signal, and outputs the resultant signal to the piezoelectric actuator 30.

Figure 3:
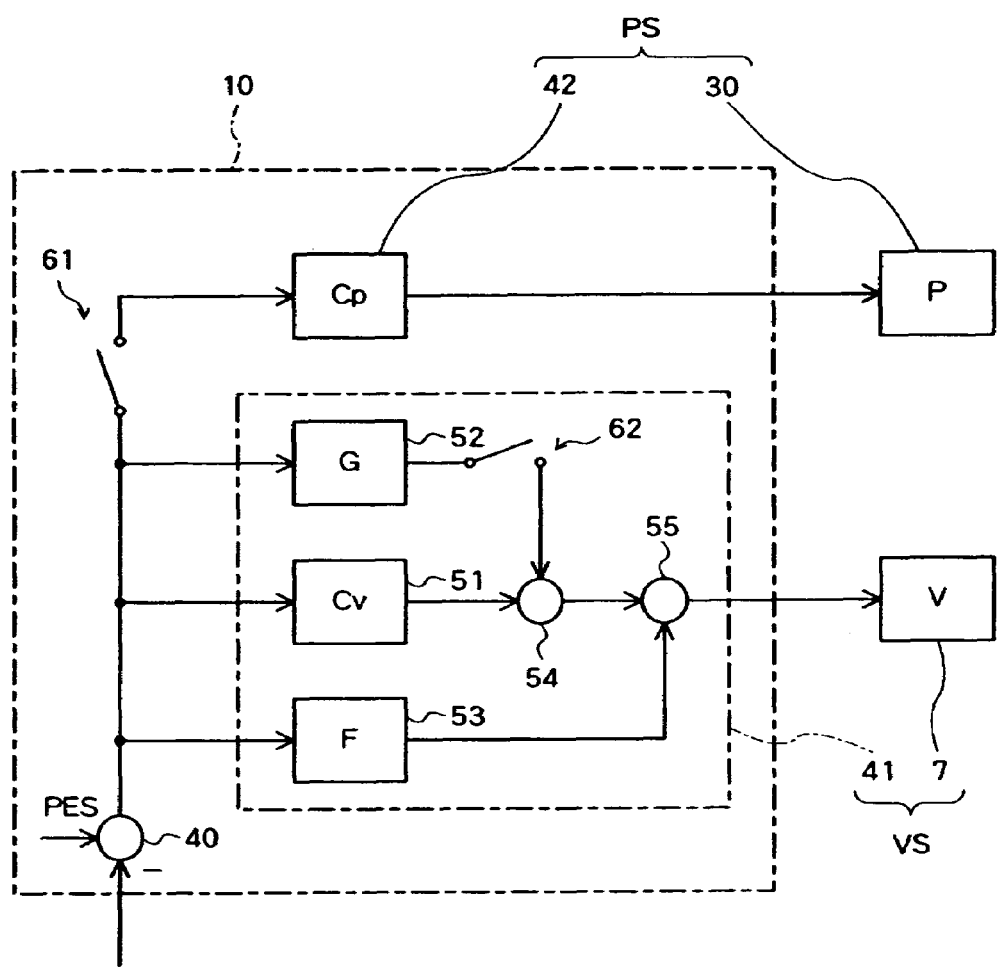
FIG. 3 shows an example of a functional configuration of a main control circuit.

FIG. 3 shows an example of a functional configuration of the main control circuit 10. The main control circuit 10 includes a position error signal generation circuit 40, a coarse adjustment control circuit 41 (first control circuit), and a fine adjustment control circuit 42 (second control circuit) to be functional in accordance with software operation of the MPU. The coarse adjustment control circuit 41 further includes a stable control element circuit 51, an unstable control element circuit 52, a filter circuit 53, a first adder 54, and a second adder 55.

Switches 61 and 62 are shown in FIG. 3 to describe a seek mode (first mode) and a positioning mode (second mode) that are realized in the main control circuit 10. A state in which the switches 61 and 62 are both open represents the seek mode (FIG. 4(A)), and a state in which the switches 61 and 62 are both closed represents the positioning mode (FIG. 4(B)).

The seek mode and the positioning mode can be switched from one another depending upon the distance between the desired and current positions of the magnetic head 4. More specifically, when the distance between the desired and current positions of the magnetic head 4 is smaller than or equal to a threshold value, the mode is switched from the seek mode to the positioning mode. The threshold value is determined in accordance with, for example, the movable range Wp (see FIG. 2) of the magnetic head 4 associated with the operation of the piezoelectric actuator 30.

The position error signal generation circuit 40 obtains a differential between a desired position of the magnetic head 4, which position is determined in accordance with a recording instruction or playback instruction issued from the external host, and the present position of the magnetic head 4, which position is input from the R/W channel 13. Then, the position error signal generation circuit 40 generates a position error signal (PES) and outputs the PES to the coarse adjustment control circuit 41 and the fine adjustment control circuit 42.

In accordance with the PES input from the position error signal generation circuit 40, the fine adjustment control circuit 42 generates and outputs a control signal for driving the piezoelectric actuator 30. In the seek mode, the fine adjustment control circuit 42 does not control the piezoelectric actuator 30. On the other hand, in the positioning mode, the fine adjustment control circuit 42 controls the piezoelectric actuator 30 so that the position error signal generation circuit 40 is positioned over the desired position.

Generally speaking, a fine adjustment control system PS operating with the fine adjustment control circuit 42 and the piezoelectric actuator 30 is faster in response speed than a coarse adjustment control system VS operating with the coarse adjustment control circuit 41 and the voice coil motor 7.

In accordance with the PES input from the position error signal generation circuit 40, the coarse adjustment control circuit 41 generates and outputs a control signal for driving the voice coil motor 7. The stable control element circuit 51 and the unstable control element circuit 52, which are included in the coarse adjustment control circuit 41, operate in the manner that the stable control element circuit 51 singly operate in the seek mode, but the stable control element circuit 51 and the unstable control element circuit 52 both operate in the positioning mode.

In the seek mode, the coarse adjustment control circuit 41 controls the voice coil motor 7 so that the magnetic head 4 is moved through the operation of the stable control element circuit 51 onto a desired position. Thereby, the coarse adjustment control system VS is rendered to be a system in which the present position of the magnetic head 4 converges to such a desired position corresponding to a stable point.

On the other hand, in the positioning mode, the coarse adjustment control circuit 41 provides control through the operation of the stable control element circuit 51 and the unstable control element circuit 52 so that the coarse adjustment control system VS is rendered to be a system in which a desired position of the magnetic head 4 is not a stable point. However, a total system including the fine adjustment control system PS and the coarse adjustment control system VS is set to be a stable system in which the present position of the magnetic head 4 converges to a desired position corresponding to a stable point.

The stable control element circuit 51 and unstable control element circuit 52 are provided in parallel. Control signals output from the respective circuits are added together by the first adder 54, and the resultant signal is output to the voice coil motor 7 by way of the second adder 55. The unstable control element circuit 52 is designed to output a control signal that sets the coarse adjustment control system VS to be the unstable system when the control signal output from the stable control element circuit 51 is added to that control signal.

As such, the expression "the coarse adjustment control system VS is the unstable system" can be defined to mean that, in view of only the coarse adjustment control system VS, the present position of the magnetic head 4 diverges without converging to a desired position. In the above, the expression "in view of only the coarse adjustment control system VS" refers to an assumed case in which while the stable control element circuit 51 and unstable control element circuit 52, which are included in the coarse adjustment control circuit 41, are both operated (by closing the switch 62 shown in FIG. 3), the fine adjustment control circuit 42 is not operated (by opening the switch 61 shown in FIG. 3). More specifically, the case in which "the coarse adjustment control system VS is the unstable system" can be alternatively defined as a case in which a transfer function formed in the coarse adjustment control system VS includes a denominator including a root of absolute value "1" or greater. The transfer function will be described further below in more detail. Further, it is designed such that, in an open loop function when viewed only in the coarse adjustment control system VS, a lowest frequency of frequencies resulting in a gain of 0 dB is higher than in the seek mode.

Thus, in the positioning mode, the response speed of the coarse adjustment control system VS can be increased in the manner that the coarse adjustment control system VS is rendered to be the unstable system. Consequently, the time period necessary for positioning the magnetic head 4 can be reduced. In addition, even when the coarse adjustment control system VS is rendered to be the unstable system, the total system, which includes the fine adjustment control system PS and the coarse adjustment control system VS, operates as a stable system. Consequently, the present position of the magnetic head 4 can be converged to the desired position corresponding to the stable point without causing the present position to diverge.

Further, since the stable control element circuit 51 is operated in any one of the seek and positioning modes, the response of the stable control element circuit 51 does not have to be converged each time the mode is switched between the seek and positioning modes. That is, it is sufficient to converge only the response of the unstable control element circuit 52, so that the time period necessary for positioning the magnetic head 4 can be reduced.

The filter circuit 53, which is included in the coarse adjustment control circuit 41, includes, for example, an integrator and a peak filter. The signal output from the filter circuit 53 is added by the second adder 55 to the control signal output from the first adder 54. The integrator outputs a PES as a result of the integration of PESs input in a predetermined time period, thereby to secure the DC component of the control signal being output to the voice coil motor 7. The peak filter outputs a signal to prevent a periodic disturbance component from being included in the PES.

The filter circuit 53 is provided in parallel to the stable control element circuit 51 and the unstable control element circuit 52 to be operated in any one of the seek and positioning modes. Thereby, the response of the filter circuit 53 does not have to be converged each time the mode is switching between the seek and positioning modes. Consequently, the time period necessary for the positioning the magnetic head 4 can be reduced.

Figure 5:
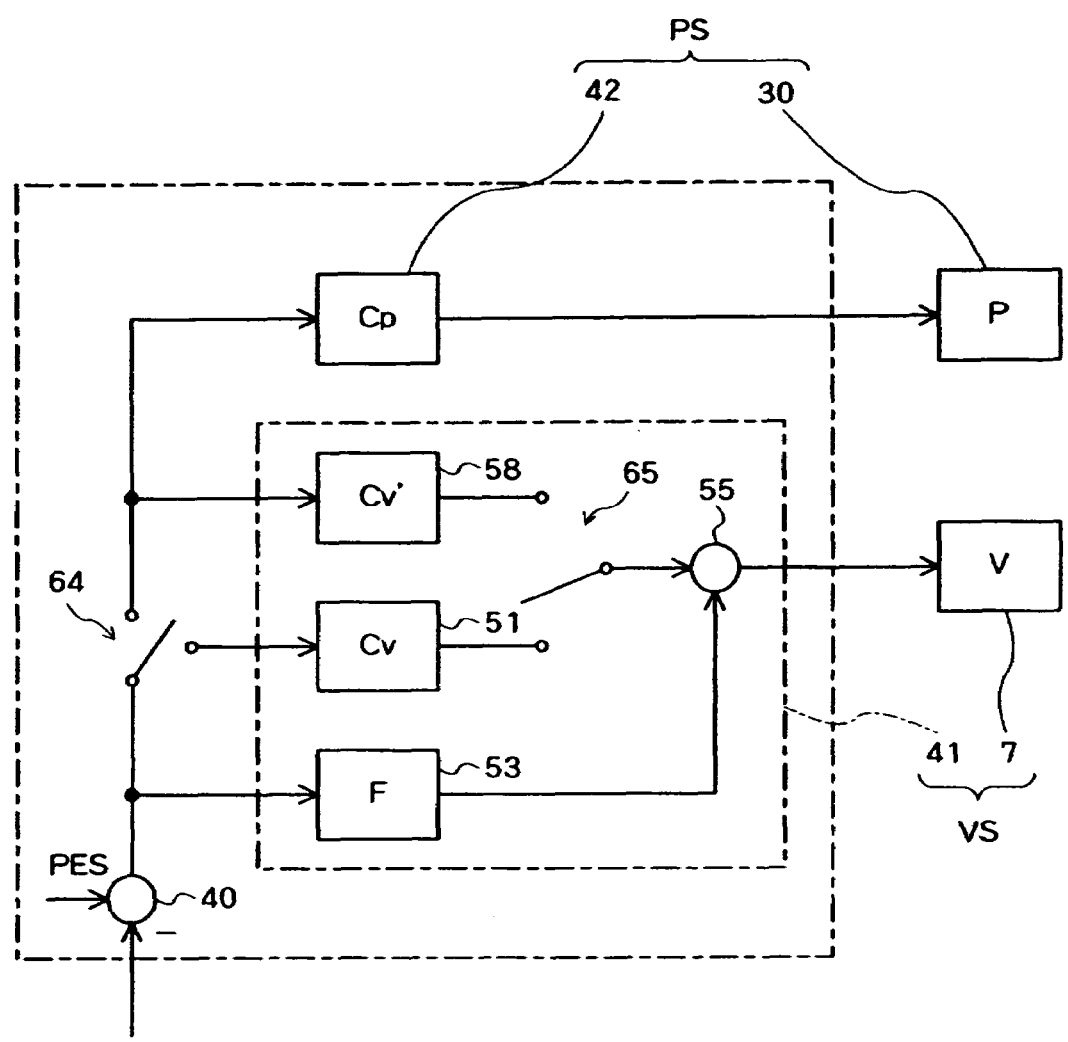
FIG. 5 is a block diagram showing a modified example of a functional configuration of a main control circuit.

The configuration of the main control circuit 10 is not limited to the type described above, but may be, for example, a configuration of a modified example shown in FIG. 5. The modified example is different from the above-described embodiment in that the modified example includes an unstable control element circuit 58 and in mode switching. In the present example, the state in which switches 64 and 65 are connected to the side of the stable control element circuit 51 represents the seek mode, and the state in which the switches 64 and 65 are connected to the side of the unstable control element circuit 58 represents the positioning mode. More specifically, among the stable control element circuit 51 and the unstable control element circuit 58, the stable control element circuit 51 operates in the seek mode, and the unstable control element circuit 58 operates in the positioning mode. The unstable control element circuit 58 is designed to output a control signal that causes the coarse adjustment control system VS to be the unstable system. Even in the configuration, since the coarse adjustment control system VS can be set to be the unstable system, the time period necessary for the positioning the magnetic head 4 can be reduced.

The transfer function of the control system, which is realized in the magnetic disk drive 1 of the present embodiment, will be described herebelow.

A sensitivity transfer function S(z) of the total control system, as shown in FIGS. 3 and 4, which includes the fine adjustment control system PS and the coarse adjustment control system VS, can be expressed as Equation 1 below.

$$S(z) = \frac{1}{1 + (f + C_V)V + GV + C_P P} \quad \text{Equation 1}$$

V represents a transfer function of the voice coil motor 7, Cv is a transfer function of the stable control element circuit 51, G represents a transfer function of the unstable control element circuit 52, F represents a transfer function of the filter circuit 53, P represents a transfer function of the piezoelectric actuator 30, and Cp represents a transfer function of the fine adjustment control circuit 42.

V, P, and F+Cv can be expressed by polynomials of respective denominators and numerators as shown in Equations 2 to 4.

$$V = \frac{E_N V_N}{E_D V_D} \quad \text{Equation 2}$$

$$P = \frac{E_N P_N}{E_D P_D} \quad \text{Equation 3}$$

$$F + C_V = \frac{D_N}{D_D} \quad \text{Equation 4}$$

It is assumed that $E_N$, $E_D$, $V_N$, $V_D$, $P_N$, $P_D$, $D_N$, and $D_D$ are polynomials of z, and a coefficient of a greatest one of $E_D$, $V_D$, $P_D$, and $D_D$ in degree is 1. It is assumed that $V_N$ and $P_N$ do not have a common root to one another. Similarly, it is assumed that $V_D$ and $P_D$ do not have a common root to one another. Further, for the sake of simplicity, it is assumed that a root (unstable root) greater than or equal to an absolute value of 1 of $D_D$ and $E_N$ is a simple root.

Here, a transfer function X is introduced, and S(z) is expressed as Equation 5 below.

$$S(z) = \frac{1}{1 + \frac{D_N}{D_D}\frac{E_N V_N}{E_D V_D} + G\frac{E_N V_N}{E_D V_D} + C_P\frac{E_N P_N}{E_D P_D}} \quad \text{Equation 5}$$
$$= \frac{E_D D_D V_D P_D}{E_D D_D V_D P_D + E_N V_N D_N P_D + G E_N V_N D_D P_D + C_P E_N P_N D_D V_D} \equiv \frac{E_D D_D V_D P_D}{z^L} X$$

L represents a degree of $E_D P_D D_D V_D$.

When X of Equation 5 can be obtained, an equation satisfying G and Cp can be known from Equation 6 below.

$$G\frac{V_N P_D}{z^M} + C_P\frac{P_N V_D}{z^M} = \frac{1}{z^M D_D E_N}\left(\frac{z^L}{X} - E_D D_D V_D P_D - E_N V_N D_N P_D\right)$$
$$\equiv U(z) \quad \text{Equation 6}$$

M represents a value indicative of greater one of the degrees of $V_N P_D$ and $P_N V_D$.

Equation 7 below can be solved, and a general solution (result) is represented as Equation 8.

$$G\frac{V_N P_D}{z^M} + C_P\frac{P_N V_D}{z^M} = 1 \quad \text{Equation 7}$$

$$\begin{bmatrix} G \\ C_P \end{bmatrix} = \begin{bmatrix} A_1(z^{-1}) \\ A_2(z^{-1}) \end{bmatrix} U + \begin{bmatrix} B_1(z^{-1}) \\ B_2(z^{-1}) \end{bmatrix} Q(z) \quad \text{Equation 8}$$

In the above, Equation 8 satisfies Equations 9 and 10 shown below. Q(z) in the above represents a stable IIR filter (infinite impulse response filter).

$$A_1(z^{-1})\frac{V_N P_D}{z^M} + A_2(z^{-1})\frac{P_N V_D}{z^M} = 1 \quad \text{Equation 9}$$

$$B_1(z^{-1})\frac{V_N P_D}{z^M} + B_2(z^{-1})\frac{P_N V_D}{z^M} = 0 \quad \text{Equation 10}$$

The above teaches that when there is X represented by Equation 5, the respective control systems shown in FIGS. 3 and 4(A)-4(B) can be realized.

X is such that, in Equations 5 and 6, unless the roots of the polynomials of the respective denominators and numerators are present within a unit circle, S(z) and U(z) are not stabilized. As such, it can be expressed such that log(X) is a bounded value in the outside of the unit circle. Consequently, log(X) can be represented by use of an appropriate natural number N, as shown in Equation 11 below.

$$\log(X) = a_1 z^{-1} + a_2 z^{-2} + \ldots = \sum_{i=1}^{N} a_i z^{-i} \quad \text{Equation 11}$$

In Equation 11, since X is 1 when z is infinitive, the parameter of $a_0$ is omitted.

When Equation 5 is expressed logarithmically or with logs, Equation 12 shown below is presented.

$$\log(S(z)) = \log|S(z)| + j\angle \log S(z) \quad \text{Equation 12}$$

$$= \log E_D D_D P_D V_D - \log z^L + \sum_{i=1}^{N} a_i z^{-i}$$

The symbol "∠" represents the phase. For example, in the case of "∠A", the symbol represents the phase of A.

When, as in Equation 13, the real part of Equation 12 is taken and the gain is specified with some frequencies ωk, design specified with an upper limit of the gains can be accomplished.

$$\log Y_k > \log|S(z)| = \text{real}(\log E_D D_D P_D V_D - \log z^L) | z \quad \text{Equation 13}$$

$$= z_k + \sum_{i=1}^{N} a_i \cos i\omega_k$$

The symbol "real" represents the real part. For example, in the case of "real A", the symbol is indicative of the real part of A. In addition, zk represents ejωk, and Yk represents the gain at ωk.

Further, the unstable roots of $D_D$ and $E_N$ have to be removed to obtain a stable U(z) of Equation 6. As such, Equation 14 below has to be satisfied for an unstable root a of $D_D$, and Equation 15 below has to be satisfied for an unstable root β of $E_N$.

$$-\sum_{i=1}^{N} a_i \alpha^{-i} + \log \alpha^L = \log(E_N D_N V_N P_D)|_{z=\alpha} \quad \text{Equation 14}$$

$$-\sum_{i=1}^{N} a_i \beta^{-i} + \log \beta^L = \log(E_D D_D V_D P_D)|_{z=\beta} \quad \text{Equation 15}$$

Equations 13 to 15 are linear with respect to the coefficient $a_i$, so that they can be solved through a linear matrix inequality (LMI). As such, as in Equation 13, a desired gain is given to some frequencies, a coefficient $a_i$ is obtained through the LMI, then a frequency corresponding to X is obtained from Equation 11 by use of the coefficient $a_i$, and then a frequency characteristic corresponding to U(z) is obtained through Equation 6. Further, a frequency characteristic corresponding to G and CP is obtained from Equation 8. In Equation 8, Q(z) is arbitrary, and hence can be set to 0, for example. When the frequency characteristic corresponding to G and CP is obtained, the transfer function can be obtained, and as a consequence, the control systems shown in FIGS. 3 and 4 can be realized.

As seen from the above, in the event that setting is specified as "CP=0," in Equation 5, or more specifically, the stability does not have to be taken into account when only the coarse adjustment control system VS is operated (when the fine adjustment control circuit 42 is not operated, but the stable control element circuit 51, the unstable control element circuit 52, and the filter circuit 53 are operated.) Suppose that it is designed such that the coarse adjustment control system VS be designed to be stable, and the fine adjustment control system PS is added thereto. In such a case, because the response speed of the voice coil motor 7 cannot be increased, the time period necessary for positioning the magnetic head 4 is dependent on the operation of the voice coil motor 7, and hence the piezoelectric actuator 30 having high response speed cannot be effectively utilized. As such, the time period necessary for positioning the magnetic head 4 can be reduced by designing the case the coarse adjustment control system to VS to be unstable.

A further embodiment will be described herebelow.

By way of example, a transfer function V of the voice coil motor 7, a transfer function P of the piezoelectric actuator 30, a transfer function Cv+F of the stable control element circuit 51 and the filter circuit 53, a transfer function CP of the fine adjustment control circuit 42, and a transfer function G of the unstable control element circuit 52 are set as shown in Equations 16 to 20.

$$V = \frac{0.08 + 0.74z + 0.18z^2}{z - 2z^2 + z^3} \quad \text{Equation 16}$$

$$P = \frac{0.0904684 + 0.3243533z + 0.1599435z^2}{-0.0386984z - 0.349806z + z^3} \quad \text{Equation 17}$$

$$F + C_V = \frac{0.1699412 - 0.013736z - 0.5346063z^2 + 0.3800801z^3}{-0.3791495 - 0.7188954z + 0.0980449z^2 + z^3} \quad \text{Equation 18}$$

-continued $$C_P = \frac{-0.0114364 + 0.1959518z - 0.3326448z^2 - 0.4425607z^3 - 0.6099262z^4}{0.2824383 + 0.0673804z + 0.6045804z^2 - 0.7166245z^3 + z^4}$$

Equation 19

$$G = \frac{-0.0087190 - 0.0849209z + 0.5607619z^2 - 0.9696932z^3 + 0.6357502z^4 - 0.1330467z^5}{0.1633908 - 0.280193z + 0.0850154z^2 + 0.9639969z^3 - 1.9286754z^4 + z^5}$$

Equation 20

Figure 6:
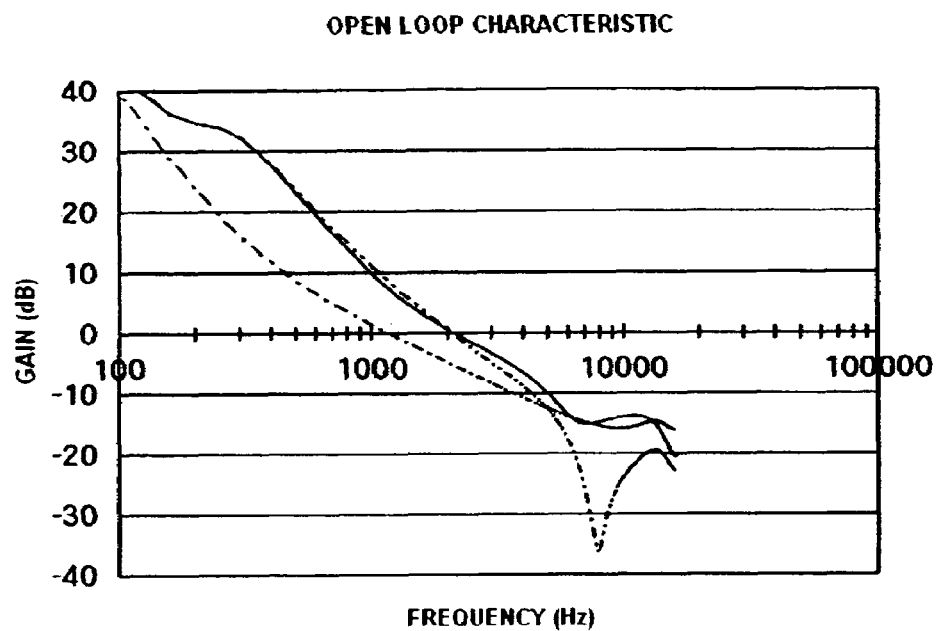
FIG. 6 is a graph showing an open loop characteristic.

FIG. 6 shows open loop characteristics in the above-described case. In the figure, the horizontal axis indicates the frequency, and vertical axis indicates the gain. The sampling time is set to 1/32400 sec.

In FIG. 6, the single-dotted chain line indicates an open loop characteristic of the coarse adjustment control system VS in the seek mode, and the solid line indicates an open loop characteristic of the total control system in the positioning mode. As shown in FIGS. 3 and 4(A)-4(B), in the seek mode, the stable control element circuit 51 and the filter circuit 53 operate in the seek mode, whereas, in the positioning mode, the fine adjustment control circuit 42 and the unstable control element circuit 52 operate in addition to the stable control element circuit 51 and the filter circuit 53.

In FIG. 6, a double-dotted line indicates an open loop characteristic of the coarse adjustment control system VS in the positioning mode. More specifically, the double-dotted line indicates the open loop characteristic in the even that the stable control element circuit 51, the filter circuit 53 and the unstable control element circuit 52 are operated (by closing the switch 62 shown in FIG. 3), but the fine adjustment control circuit 42 is not operated (by opening the switch 61).

According to FIG. 6, it can be known that, while the open loop characteristic (double-dotted line) of the coarse adjustment control system VS in the positioning mode in which the transfer function Cp is set to 0 through Equation 5 corresponds to the unstable system, the open loop characteristic (solid line) of the total control system in the positioning mode corresponds to the stable system.

Figure 7:
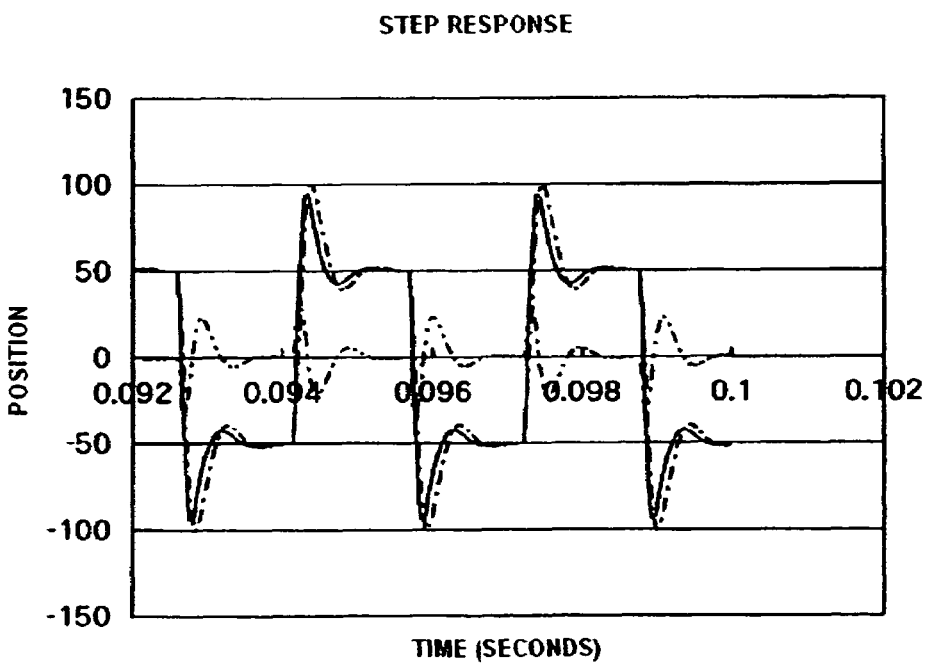
FIG. 7 is a graph showing a step response.

FIG. 7 shows a response characteristic in the positioning mode. In the figure, the horizontal axis indicates the time (period), and the vertical axis indicates the position of the magnetic head 4, for example. In the figure, the response characteristic is shown in the case the desired position of the magnetic head 4 is represented by a step function.

In FIG. 7, the solid line indicates the position of the magnetic head 4, the single-dotted chain line indicates the operation position of the voice coil motor 7, and the double-dotted line indicates the operation position of the piezoelectric actuator 30.

According to FIG. 7, it can be known that the voice coil motor 7 operates at a sufficiently high speed and in a stable state. As described above, while the coarse adjustment control system VS is designed to unstably operate, the coarse adjustment control system VS and the total control system including the fine adjustment control system PS are designed to stably operate. Thereby, the response speed of the voice coil motor 7 can be increased, and hence the time period necessary for positioning the magnetic head 4 can be reduced.

What is claimed is:

1. A magnetic disk drive comprising:
a magnetic disk medium;
a magnetic head for reading out information recorded in the magnetic disk medium;
an arm for supporting the magnetic head;
a first actuator for actuating the arm to perform control of a position of the magnetic head on the magnetic disk;
a second actuator for adjusting the position of the magnetic head on the arm;
a position error signal generation circuit for generating a position error signal indicative of an error between a desired position of the magnetic head and a present position of the magnetic head in accordance with the information read out by the magnetic head;
a first control circuit for generating a signal for controlling the first actuator in accordance with the position error signal and for outputting the signal;
a second control circuit for generating a signal for controlling the second actuator in accordance with the position error signal and for outputting the signal;
a main control circuit for selecting one of first and second modes in accordance with the position error signal, the first mode being for setting a control system inclusive of the first control circuit and the first actuator to be a stable system by not causing control of the second actuator to be performed by the second control circuit, and the second mode being for setting the control system for setting a control system inclusive of the first control circuit and the first actuator to be an unstable system and setting a control system inclusive of the first control circuit, the first actuator, the second actuator, and the second actuator to be the stable system by causing the control of the second actuator to be performed by the second control circuit, thereby causing the control circuits to operate.

2. The magnetic disk drive according to claim 1, characterized in that
the first control circuit includes a stable control element circuit and an unstable control element circuit that outputs an output signal being added to an output of the stable control element circuit to thereby set the control system inclusive of the first control circuit and the first actuator to be the unstable system;
when being operated by the main control circuit in the first mode, the unstable control element circuit is not operated, but the stable control element circuit is operated, thereby to set the control system inclusive of the first control circuit and the first actuator to be the stable system; and
when being operated by the main control circuit in the second mode, the unstable control element circuit and the stable control element circuit are both operated, thereby to set the control system inclusive of the first control circuit and the first actuator to be the unstable system.

3. The magnetic disk drive according to claim 1, characterized in that the first control circuit includes a filter circuit that imparts a predetermined modification to an output signal being output to the first actuator in accordance with the position error signal in any one of the first mode and the second mode.

* * * * *